(12) United States Patent
Chang et al.

(10) Patent No.: US 8,700,839 B2
(45) Date of Patent: Apr. 15, 2014

(54) METHOD FOR PERFORMING STATIC WEAR LEVELING ON FLASH MEMORY

(75) Inventors: Yuan-Hao Chang, Tainan (TW); Jen-Wei Hsieh, Taipei (TW); Tei-Wei Kuo, Taipei (TW); Cheng-Chih Yang, Taipei (TW)

(73) Assignee: Genesys Logic, Inc., Taipei (TW)

( * ) Notice: Subject to any disclaimer, the term of this patent is extended or adjusted under 35 U.S.C. 154(b) by 1298 days.

(21) Appl. No.: 11/963,262

(22) Filed: Dec. 21, 2007

(65) Prior Publication Data

US 2008/0162796 A1 Jul. 3, 2008

(30) Foreign Application Priority Data

Dec. 28, 2006 (TW) ............................... 95149542 A

(51) Int. Cl.
*G06F 12/00* (2006.01)
*G06F 13/00* (2006.01)
*G06F 13/28* (2006.01)
*G06F 12/02* (2006.01)
*G06F 3/06* (2006.01)

(52) U.S. Cl.
CPC ............ *G06F 12/0246* (2013.01); *G06F 12/00* (2013.01); *G06F 3/0688* (2013.01); *G06F 2212/1036* (2013.01); *G06F 2212/7201* (2013.01); *G06F 2212/2022* (2013.01); *G06F 2212/7202* (2013.01); *G06F 2212/7205* (2013.01); *G06F 2212/7211* (2013.01); *G06F 2212/222* (2013.01)
USPC ........... 711/103; 711/111; 711/112; 711/114; 711/154; 711/165; 711/170; 711/E12.002; 711/E12.008; 711/E12.059; 711/E12.078; 365/185.11; 365/185.33; 714/763; 714/773; 707/824

(58) Field of Classification Search
USPC .......... 711/104, E12.008, 103, 111, 112, 114, 711/154, 165, 170, E12.002, E12.059, 711/E12.078
See application file for complete search history.

(56) References Cited

U.S. PATENT DOCUMENTS 5,479,638 A * 12/1995 Assar et al. .................... 711/103
5,485,595 A * 1/1996 Assar et al. .................... 711/103
(Continued)

FOREIGN PATENT DOCUMENTS

EP          1840722 A2 * 10/2007  ................ G06F 3/06
JP    2003256289 A  *  9/2003  ............. G06F 12/16
(Continued)

OTHER PUBLICATIONS

Endurance Enhancement of Flash-Memory Storage Systems: An Efficient Static Wear Leveling Design, Chang et al, DAC 2007, Jun. 4-8, 2007m pp. 212-217 (6 pages).*

(Continued)

*Primary Examiner* — Arpan P. Savla
*Assistant Examiner* — Daniel C Chappell
(74) *Attorney, Agent, or Firm* — Kirton McConkie; Evan R. Witt

(57) ABSTRACT

A method for performing a static wear leveling on a flash memory is disclosed. Accordingly, a static wear leveling unit is disposed with a block reclamation unit of either a flash translation layer or a native file system in the flash memory, and utilizes less memory space to trace a distribution status of block leveling cycles of each physical block of the flash memory. Based on the distribution record of the block leveling cycles, the number of the leveling cycles less than a premeditated threshold would be found while the system idles. Then the static wear leveling unit requests the block reclamation unit to level the found blocks. Before leveling the from one block to another block which is leveled frequently, whereby accurate wear leveling cycles for the blocks can be averaged extremely.

3 Claims, 6 Drawing Sheets

(56) References Cited

U.S. PATENT DOCUMENTS

| | | | | |
|---|---|---|---|---|
| 6,000,006 A * | 12/1999 | Bruce et al. | | 711/103 |
| 6,081,447 A * | 6/2000 | Lofgren et al. | | 365/185.02 |
| 6,230,233 B1 * | 5/2001 | Lofgren et al. | | 711/103 |
| 6,426,893 B1 * | 7/2002 | Conley et al. | | 365/185.11 |
| 6,594,183 B1 * | 7/2003 | Lofgren et al. | | 365/185.33 |
| 6,732,221 B2 * | 5/2004 | Ban | | 711/103 |
| 6,831,865 B2 * | 12/2004 | Chang et al. | | 365/185.33 |
| 6,850,443 B2 * | 2/2005 | Lofgren et al. | | 365/185.29 |
| 6,865,122 B2 * | 3/2005 | Srinivasan | | 365/200 |
| 6,973,531 B1 * | 12/2005 | Chang et al. | | 711/103 |
| 6,985,992 B1 * | 1/2006 | Chang et al. | | 711/103 |
| 7,012,835 B2 * | 3/2006 | Gonzalez et al. | | 365/185.11 |
| 7,120,729 B2 * | 10/2006 | Gonzalez et al. | | 711/103 |
| 7,224,607 B2 * | 5/2007 | Gonzalez et al. | | 365/185.11 |
| 7,353,325 B2 * | 4/2008 | Lofgren et al. | | 711/103 |
| 7,394,692 B2 * | 7/2008 | Chen et al. | | 365/185.11 |
| 7,441,067 B2 * | 10/2008 | Gorobets et al. | | 711/103 |
| 7,518,919 B2 * | 4/2009 | Gonzalez et al. | | 365/185.11 |
| 7,523,013 B2 * | 4/2009 | Gorobets et al. | | 702/177 |
| 7,523,249 B1 * | 4/2009 | Estakhri et al. | | 711/103 |
| 7,552,272 B2 * | 6/2009 | Gonzalez et al. | | 711/103 |
| 7,631,138 B2 * | 12/2009 | Gonzalez et al. | | 711/103 |
| 7,636,258 B2 * | 12/2009 | Kux et al. | | 365/185.18 |
| 7,688,643 B2 * | 3/2010 | Lofgren et al. | | 365/185.28 |
| 7,743,203 B2 * | 6/2010 | France | | 711/103 |
| 7,778,077 B2 * | 8/2010 | Gorobets et al. | | 365/185.09 |
| 8,060,718 B2 * | 11/2011 | Freitas et al. | | 711/165 |
| 8,065,469 B2 * | 11/2011 | Mothilal | | 711/103 |
| 8,082,386 B2 * | 12/2011 | Kao et al. | | 711/103 |
| 8,200,891 B2 * | 6/2012 | Mukaida et al. | | 711/103 |
| 8,200,892 B2 * | 6/2012 | Mukaida | | 711/103 |
| 8,205,036 B2 * | 6/2012 | Chen et al. | | 711/103 |
| 8,301,826 B2 * | 10/2012 | Gonzalez et al. | | 711/103 |
| 8,407,408 B2 * | 3/2013 | Mothilal | | 711/103 |
| 2003/0177302 A1 * | 9/2003 | Pistilli | | 711/103 |
| 2003/0227804 A1 * | 12/2003 | Lofgren et al. | | 365/200 |
| 2005/0102466 A1 * | 5/2005 | Chen et al. | | 711/103 |
| 2005/0114589 A1 * | 5/2005 | Lofgren et al. | | 711/103 |
| 2006/0075395 A1 * | 4/2006 | Lee et al. | | 717/168 |
| 2008/0320214 A1 * | 12/2008 | Ma et al. | | 711/103 |
| 2009/0043831 A1 * | 2/2009 | Antonopoulos et al. | | 707/205 |
| 2009/0089489 A1 * | 4/2009 | Mukaida et al. | | 711/103 |
| 2009/0122949 A1 * | 5/2009 | Reid et al. | | 377/15 |
| 2009/0241010 A1 * | 9/2009 | Yano et al. | | 714/764 |
| 2010/0037001 A1 * | 2/2010 | Langlois et al. | | 711/103 |
| 2010/0262875 A1 * | 10/2010 | Hetzler et al. | | 714/719 |
| 2010/0318719 A1 * | 12/2010 | Keays et al. | | 711/103 |
| 2011/0138109 A1 * | 6/2011 | Liu et al. | | 711/103 |
| 2011/0145474 A1 * | 6/2011 | Intrater | | 711/103 |
| 2011/0283044 A1 * | 11/2011 | Olds et al. | | 711/102 |
| 2012/0191927 A1 * | 7/2012 | Gorobets et al. | | 711/156 |
| 2012/0198137 A1 * | 8/2012 | Mothilal | | 711/103 |
| 2012/0246393 A1 * | 9/2012 | Hashimoto | | 711/103 |
| 2012/0271991 A1 * | 10/2012 | Allen et al. | | 711/103 |
| 2012/0303919 A1 * | 11/2012 | Hu et al. | | 711/165 |
| 2013/0036253 A1 * | 2/2013 | Baltar | | 711/103 |

FOREIGN PATENT DOCUMENTS

| | | | |
|---|---|---|---|
| JP | 2007133683 A * | 5/2007 | |
| TW | 200406771 | 5/2004 | |
| TW | 200421349 | 10/2004 | |
| WO | WO 2007112555 A1 * | 10/2007 | |

OTHER PUBLICATIONS

Rejuvenator: A static wear leveling algorithm for NAND flash memory with minimized overhead, Murugan et al, 2011 IEEE 27th Symposium on Mass Storage Systems and Technologies (MSST), May 23-27, 2011, pp. 1-12 (12 pages).*

Improving Flash Wear-Leveling by Proactively Moving Static Data, Chang et al, IEEE Transactions on Computers, vol. 59, iss. 1, Jan. 2010, pp. 53-65 (13 pages).*

A Group-Based Hybrid Wear-Leveling Algorithm for Flash Memory Storage Systems, Liu et al, 2012 Third International Conference on Digital Manufacturing and Automation (ICDMA), Jul. 31, 2012-Aug. 2, 2012, pp. 58-61 (4 pages).*

Wear Leveling in Single Level Cell NAND Flash Memories, STMicroelectronics, AN1822 Application note, Nov. 2004.

* cited by examiner

METHOD FOR PERFORMING STATIC WEAR LEVELING ON FLASH MEMORY

FIELD OF THE INVENTION

The present invention generally relates to a method for performing a static wear leveling on a flash memory, and more particularly, to a wear leveling method used for a memory block leveling of a flash memory with accurate wear leveling cycles.

BACKGROUND OF THE INVENTION

In a present flash memory data access management technique, a data stored in a flash memory block could not be read out correctly after block leveling of approximate one hundred thousand cycles. Such a matter that a flash memory block could not be read correctly due to excessive leveling cycles is generally called 'Write-through'. Since the flash memory has a limited service life, it is a significant topic to create how to procrastinate Write through of the block for prolongating the flash memory service life. For solving the problem, the conventional method approaches the wear leveling cycles of every block as equivalent as possible by evenly distributing the data into every block of the flash memory with utilizing of a Wear Leveling Scheme.

The conventional Wear Leveling Scheme comprises a Dynamic Wear Leveling Scheme and a Static Wear Leveling Scheme. The implementation of the Dynamic Wear Leveling Scheme is to update data or write a data into a free block of a system, wherein the free block is formed by leveling the block whose data are overdue. Therefore, advantages of the Dynamic Wear Leveling Scheme includes a simplified design, low cost, and block leveling cycles more than the predetermined amount. However, drawbacks of the Dynamic Wear Leveling Scheme are that the block which stores frequently updated data is leveled frequently and the block which stores rarely updated data is leveled infrequently; Therefore the leveling cycles of all blocks are not equalized.

In addition, an implementation of the Static Wear Leveling Scheme is to keep traces of the leveling cycles of every block. In other words, the Static Wear Leveling Scheme levels the less leveling-cycle block when the system needs extra free blocks. Therefore, the advantage of the Static Wear Leveling Scheme completely achieves the wear leveling for the blocks. However, the drawbacks of the Static Wear Leveling Scheme are higher system management expense, such as moving surplus data and consuming memory spaces required for traces of the leveling cycles of every block.

SUMMARY OF THE INVENTION

To solve the foregoing drawbacks, an objective of the present invention is to provide a method for performing a static wear leveling on a flash memory, and this static wear leveling is capable of achieving the complete wear leveling under a less system management expense.

Another objective of the present invention is to provide a method for performing a static wear leveling on a flash memory, which only needs to dispose at least one static wear leveling unit having higher transplantation and versatility for a conventional flash translation layer or a block reclamation unit of a native file system.

In accordance with an aspect of the present invention, the method for performing the static wear leveling unit on the flash memory additionally disposes at least one highly efficient static wear leveling unit to a conventional flash translation layer or a block reclamation unit of a native file system, wherein the highly efficient static wear leveling unit traces a distribution status of the block leveling by using less memory spaces. Therefore, the static wear leveling unit examines a distribution record of the block leveling for finding out the block whose leveling cycles are less than a predetermined threshold when the system is idle, and then sends a request to the block reclamation unit to level the block. The data of such a block which is rarely updated would be compelled to move from a block to another block which is leveled frequently. This could average the leveling cycles of the blocks extremely to approach the effects of lower cost, higher transplantation and wear leveling.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
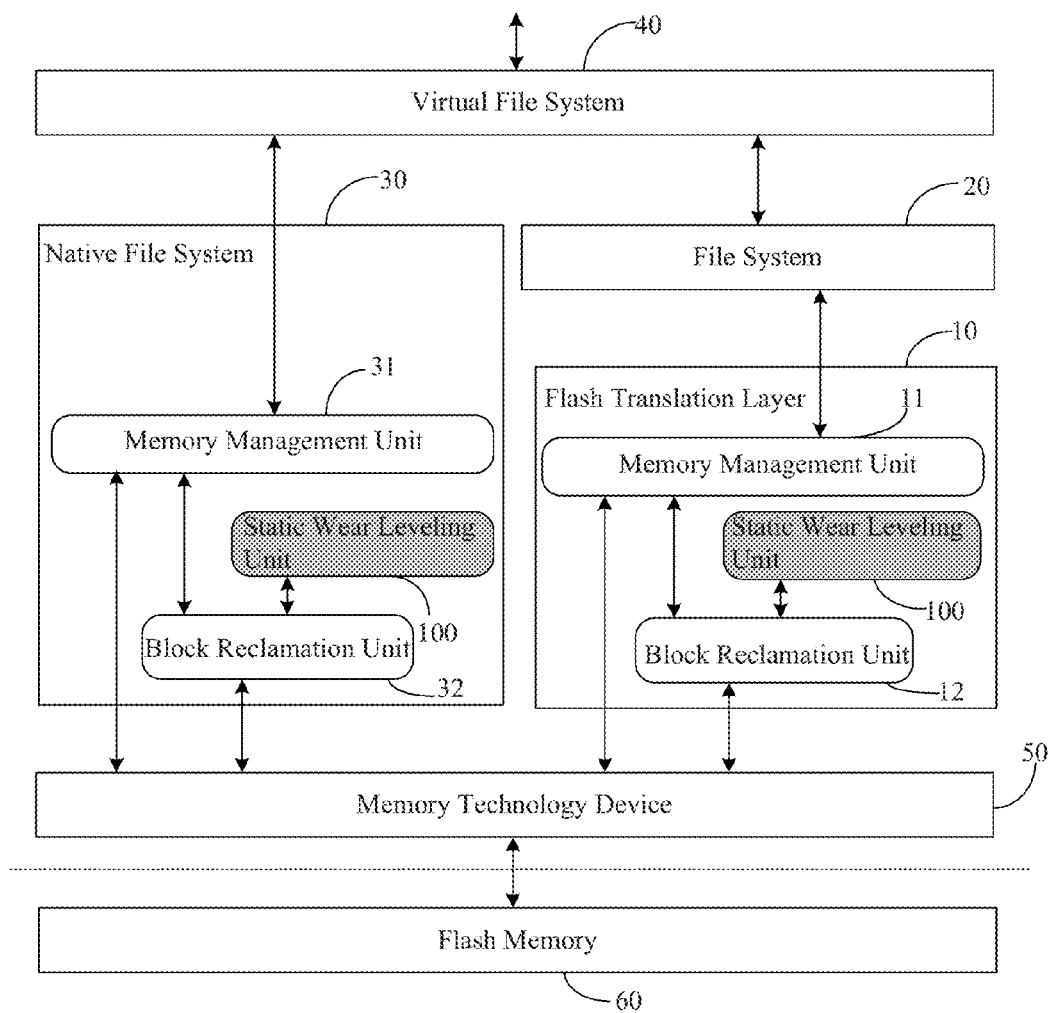
FIG. 1 illustrates a system schematic diagram which caches an address translation layer of a flash memory by utilizing a method for performing a static wear leveling on a flash memory according to the present invention.

Please refer to FIG. 1. FIG. 1 illustrates a system schematic diagram which caches an address translation layer of a flash memory by utilizing a method for performing a static wear leveling on a flash memory according to the present invention. The conventional system communicates with a file system 20 such as FAT or EXT2 via a flash translation layer 10. In addition, the conventional system also can directly communicate with a virtual file system 40 via a native file system 30 such as JFFS2 or YAFFS2 and access a flash memory 60 via a MTD (Memory Technology Device) 50.

The flash translation layer 10 comprises a memory management unit 11 and a block reclamation unit 12; likewise the native file system 30 also comprises a memory management unit 31 and a block reclamation unit 32. Accordingly, the flash translation layer 10 and the native file system 30 are upwardly linked to the virtual file system 40 via the memory management unit 11 and the memory management unit 31, respectively. In addition, the memory management unit 11 and the memory management unit 31 are downwardly linked to the block reclamation unit 12 and the block reclamation unit 32, respectively, and thereby manage and perform a block leveling operation on the flash memory 60.

The basic concept of the method according to the present invention is additionally dispose a static wear leveling unit 100 into either the block reclamation unit 12 of the flash translation layer 10 or the block reclamation unit 32 of the native file system 30. By utilizing the flash translation layer 10 or the native file system 30 alternatively, the method of the present invention can achieve the effects of higher transplantation and wear leveling. In addition, the static wear leveling unit 100 can be implemented by a hardware circuit or software.

Figure 2:
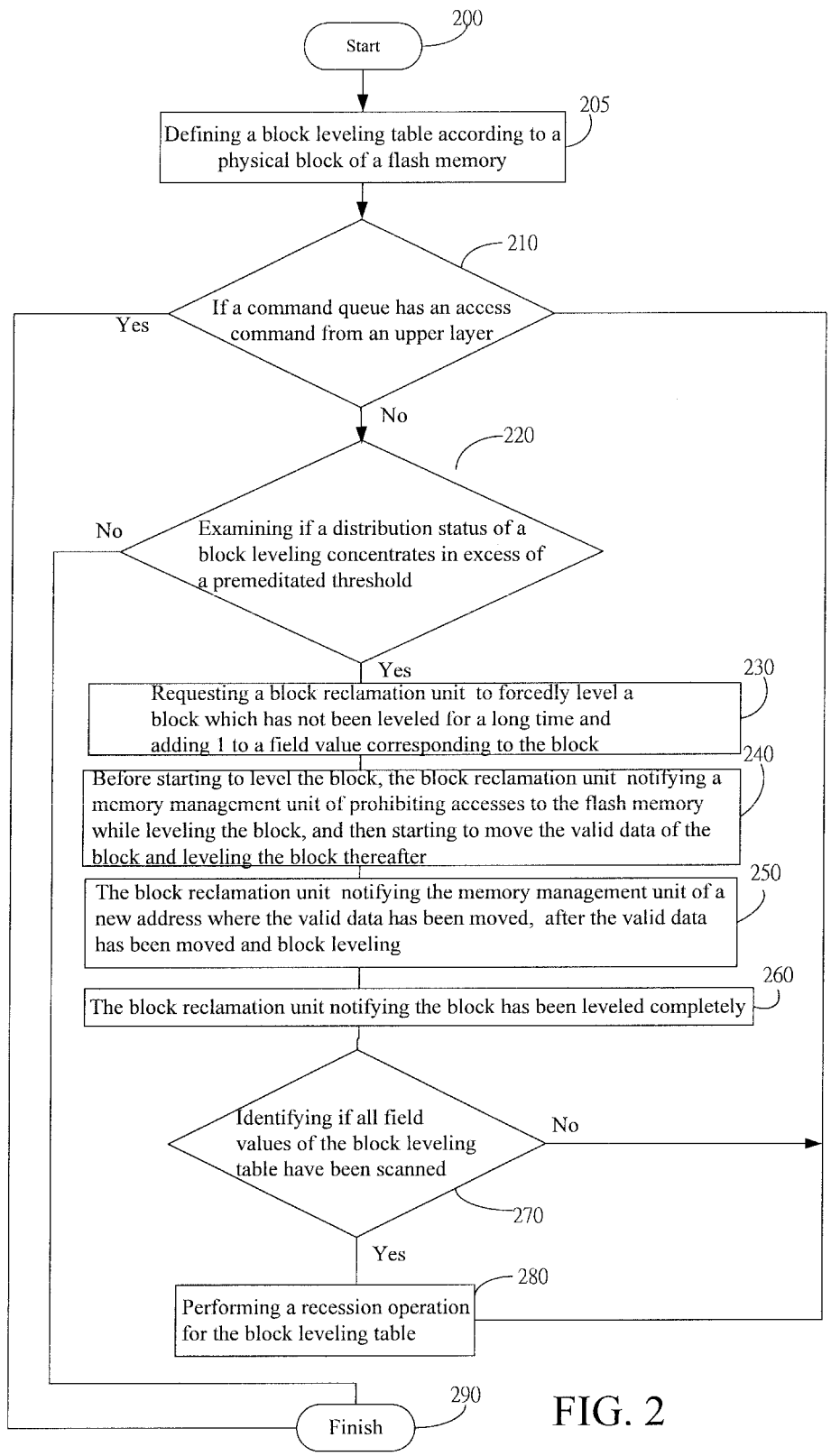
FIG. 2 illustrates a flow chart of caching an address translation layer of a flash memory in method according to the present invention.
Figure 3:
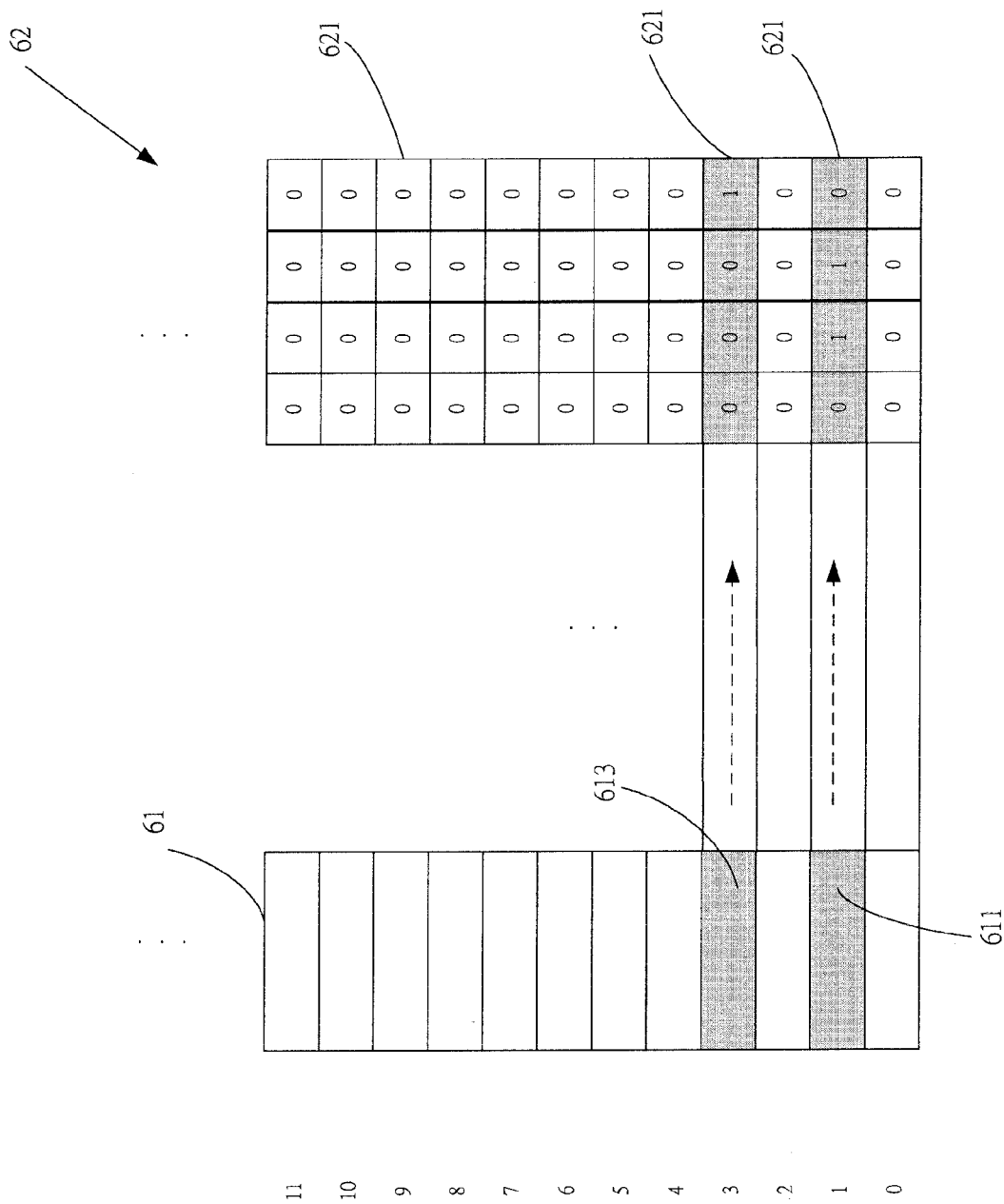
FIG. 3 illustrates a diagram of a first embodiment for a block leveling table in the method according to the present invention.
Figure 4:
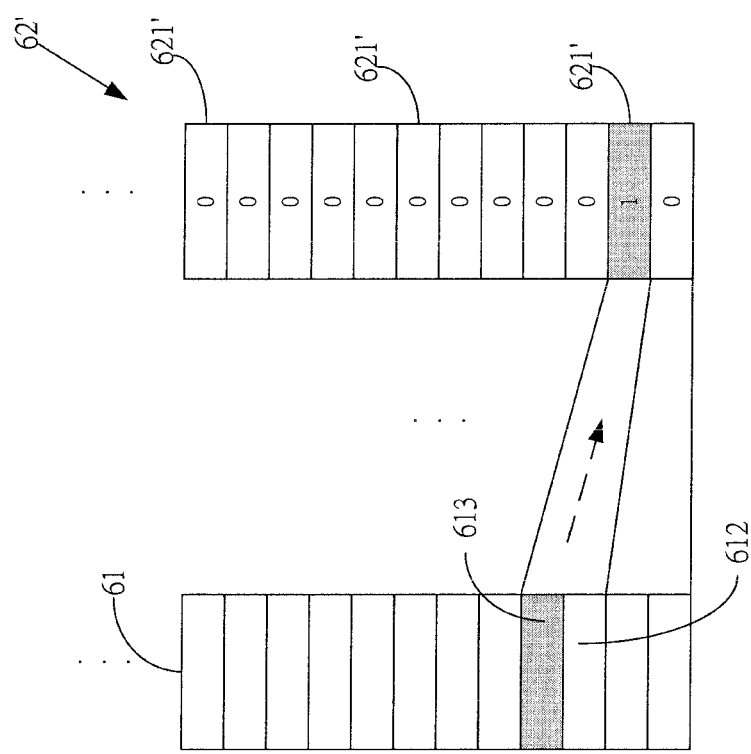
FIG. 4 illustrates a diagram of a second embodiment for a block leveling table in the method according to the present invention.

Please refer to FIGS. 2, 3 and 4. FIG. 2 illustrates a flow chart of caching an address translation layer of a flash memory in the method according to the present invention, as an operation of the static wear leveling unit 100 shown in FIG. 1. Accordingly, the flow chart comprises the following steps from (200) to step (290).

After the system starts in step 200, step (205) defines a block leveling table according to the physical block 61 of the flash memory 60. In other words, as shown in FIG. 3 or 4, the defined block leveling table 62 or 62' is dependent on the number of the leveling cycles for the physical block 61 of a flash memory 60. In FIG. 3, the block leveling table 62 exhibits an one-to-multiple mode that a physical block 61 corresponds to a 4-bit field 621 value, wherein the first physical block 611 has been leveled for 6 cycles and the third physical block 613 has been leveled once as pointed by arrows in FIG. 3.

As shown in FIG. 4, the block leveling table 62' exhibits a multiple-to-one mode that more than one physical block 61 corresponds to a 1-bit field value 621', wherein the second physical block 612 is a physical block without level and the third physical block 613 has been leveled. However, the block leveling table 62' only provides that at least one physical block of both the second physical block 612 and the third physical block 613 has been leveled. Even though the accuracy of the mode is imperfect, the data still can be compelled to move and level only when the second physical block 612 and the third physical block 613 both corresponding to the same field value 621' are never leveled.

However, if one of the second physical block 612 and the third physical block 613 has been leveled, then a data updated frequently would be written into other physical blocks 61. Oppositely, if a data rarely updated is finally written into the physical blocks 61, it means the data stored in the second physical block 612 and the third physical block 613 both are rarely updated and to be compelled to move. In addition, the block leveling table 62 or the block leveling table 62' are stored in the static wear leveling unit 100 or the flash memory 60, alternatively.

In step (210) the static wear leveling unit 100 examines if its command queue receives an access command from an upper layer as at least one of the flash translation layer 10 and the native file system 30. If the static wear leveling unit receives any access command, then end the follow-up steps. Otherwise, the static wear leveling unit 100 operates after a specific period when the virtual file system 40 of the native file system 30 do not send any request to access the flash memory.

In step (220), at least one static wear leveling unit 100 examines if a distribution status of the block leveling concentrates in excess of a premeditated threshold. If yes, progressing the step (230), and otherwise, ending the follow-up steps.

In step (230), the static wear leveling unit 100 requests the block reclamation unit 12 or 32 of the flash translation layer 10 or the native file system 30 to force leveling a block which has not been leveled for a long time and add 1 to the field 621 or the field 621' corresponding to the physical block 61. It means that the physical block 61 corresponding to which value is 0 in the field 621 or the field 621' of the block leveling table 62 or the block leveling table 62' should be leveled by the block reclamation unit 12 or 32 in the flash translation layer 10 or the native file system 30.

After adding 1 into the field 621 or 621' whose value is 0, in the step 230, a maintaining operation is performed for the block leveling table 62 or the block leveling table 62'.

In step (240), before the block reclamation unit 12 or 32 requested by the static wear leveling unit 100 in the flash translation layer 10 or the native file system 30 starts to level the physical block 61 of the flash memory 60, the block reclamation unit 12 or 32 notifies a memory management unit 11 or 31 to prohibit any access to the flash memory while leveling the block 61, and then start to move the valid data stored in the physical block 61 that the static wear leveling unit 100 wants to level. Next, the static wear leveling unit 100 starts to level the physical block 61 whose valid data have been moved out.

In step (250), the block reclamation unit 12 or 32 notifies the memory management unit 11 or 31 of a new physical address where the valid data of the physical block 61 has been moved after the block reclamation unit 12 or 32 moves the valid data and then levels the physical block 61 so that the memory management unit 11 or 31 can update a corresponding relationship between the new physical address of the physical block 61 and a logical address of the valid data.

In step (260), the block reclamation unit 12 or 32 linked to the static wear leveling unit 100 notifies the memory management unit 11 or 31 that the physical block 61 has been leveled completely.

In step 270, the static wear leveling unit 100 identifies if all field values of the block leveling table 62 or 62' have been scanned by examining if all values in the field 621 or 621' of the block leveling table 62 or 62' appear 1. If yes, the next step 280 is performed; Otherwise the process goes back to step (210).

Step 280 performs a recession operation for the block leveling table 62 or 62' and the process goes back to step (210). And, the system finish implements in FIG. 290.

Figure 5:
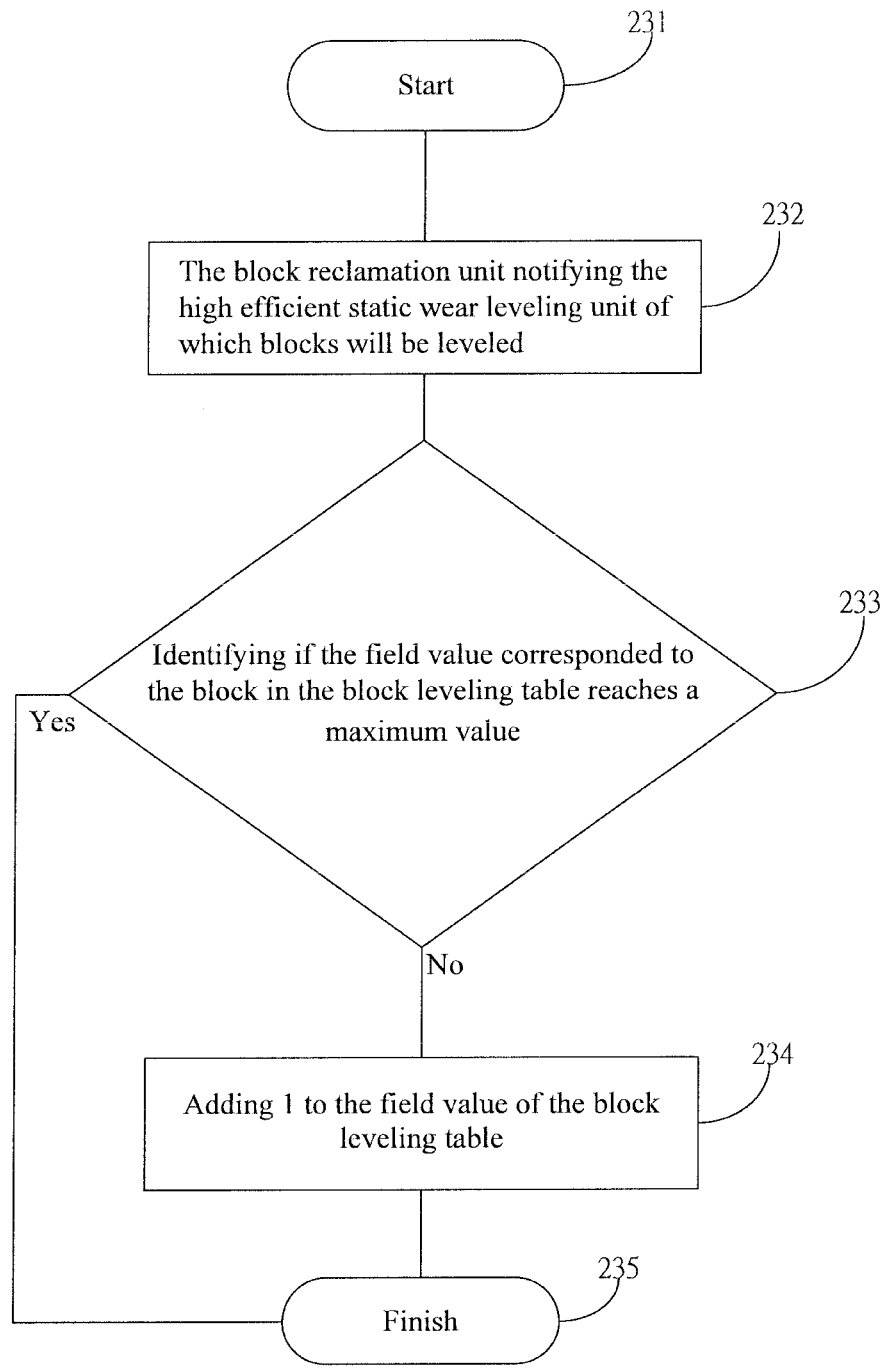
FIG. 5 illustrates a flow chart of a maintenance operation for a block leveling table in the method according to the present invention.

Please refer to FIG. 5. FIG. 5 illustrates a flow chart of a maintaining operation for a block leveling table in the method according to the present invention, as mentioned in the step (220) in FIG. 2. The flow chart comprises the steps from (231) to (235) as the followings.

The maintaining operation starts in step (231). In the next step (232), at least one of the block reclamation unit 12 or 32 in the flash translation layer 10 and the native file system 30 notifies the static wear leveling unit 100 of leveling the physical block which will be leveled in the flash memory 60.

Step (233) identifies if the field value corresponded to the block in the block leveling table reaches a maximum value by examining if all values of the field 621 or 621' for the block leveling table 62 or 62' appear 0. If yes, the process goes to Step (235) to finish; Otherwise it goes to the step (234)

Step (234) adds 1 into the field 621 or 621' whose value appears 0 for the block leveling table 62 or 62'. Therefore in the flash memory 60, an accurate leveling cycle of the physical block 61 can be examined.

Figure 6:
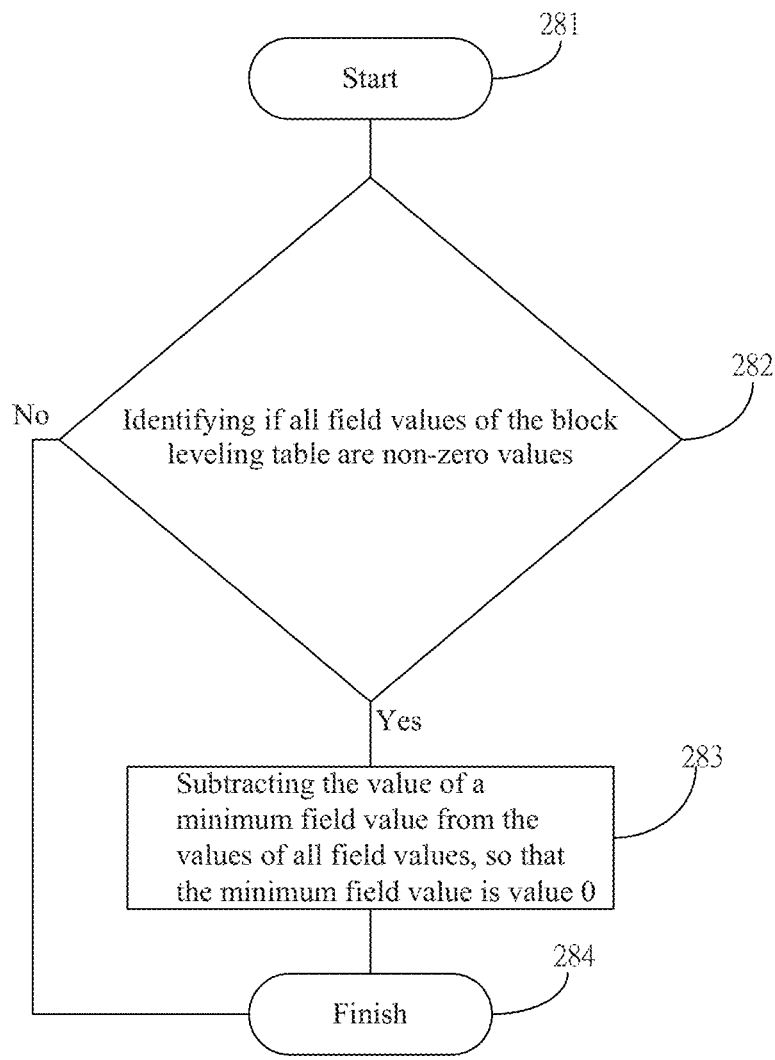
FIG. 6 illustrates a flow chart of a recession operation for a block leveling table structure in the method according to the present invention.

Please refer to FIG. 6, FIG. 6 illustrates a flow chart of a recession operation for a block leveling table in the method according to the present invention, as mentioned above in the step (255) of FIG. 2. The flow chart comprises the following steps from (281) to (284).

The recession operation starts in the step (281). The next step (282) identifies if all values of the fields 621 or 621' in the block leveling table 62 or 62' appear non-zero by examining if all values of the fields 621 or 621' appear 1. If yes, the process goes to the step 283; Otherwise it goes to the step 284 to finish.

Step (283) subtracts the values of the field 621 from the value of a minimum field 621 for the block leveling table 62 or subtracts the values of the field 621' from the value of a minimum field 621' for the block leveling table 62'. Therefore, the value of the minimum filed 621 of the block leveling table 62 or the minimum filed 621' of the block leveling table 62' appears 0. The step (284) finishes the operation.

In conclusion, a basic concept of the static wear leveling unit 100 of the present invention is to trace the distribution status of each physical block 61 in the flash memory 60 by utilizing less memory space. By examining a record regarding to the leveling distribution, the static wear leveling unit 100 can find out the physical block 61 whose leveling cycles are less than the threshold when the system is idle (as the command queue does not receive any access command from the upper layer for a long time). Such a physical block 61 still stores data and hasn't been leveled for a long time. In addition, the static wear leveling unit 100 sends a request for leveling the physical block 61 to the block reclamation unit 12 or 32. Therefore, the data rarely updated is compelled to move from a physical block 61 to another physical block 61 which is leveled frequently so that the leveling cycles for the physical block 61 are averaged extremely for a long period.

In addition, since the static wear leveling unit 100 only communicates with the block reclamation unit 12 or 32, it only needs to add an interface into the block reclamation unit 12 of the flash translation layer 10 or the block reclamation unit 32 of the native file system 30 to communicate with the static wear leveling unit 100 without modifying other parts of the system. Therefore, the original operation scheme built with the memory management unit 11 of the flash translation layer 10, the memory management unit 31 of the native file system 30, the block reclamation unit 12 of the flash translation layer 10, and the block reclamation unit 32 of the native file system 30 are all preserved.

As mentioned above, FIG. 1 to FIG. 6 illustrating the method for performing the static wear leveling on the flash memory according to the present invention should be understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A method for performing a static wear leveling on a flash memory, which is performed by at least one static wear leveling unit linked to a block reclamation unit of either a flash translation layer or a native file system having a memory management unit, wherein the block reclamation unit is linked to the flash memory for performing a leveling operation on a physical block of the flash memory, the method comprising the steps of:
- (A) defining a block leveling table whose fields are used for traces of block leveling cycles of the physical block of the flash memory, then proceeding to step (B);
- (B) examining if an access command has been received from at least one of the flash translation layer and the native file system, wherein if the access command is received, proceeding to step (M), and otherwise, proceeding to step (C);
- (C) examining if a distribution status of the block leveling cycles concentrates block leveling cycles in excess of a premeditated threshold, wherein if the distribution status concentrates block leveling cycles to be in excess of the premeditated threshold, proceeding to step (D), and if the distribution status is smaller than the premeditated threshold, proceeding to step (M);
- (D) requesting the block reclamation unit of either the flash translation layer or the native file system to force leveling of the physical block corresponding to a field whose value appears 0 in the block leveling table, proceeding to step (E);
- (E) adding 1 into the field of the block leveling table whose value appears 0 and performing a maintaining operation, wherein the maintaining operation of the step (E) further comprises the steps of:
  - (E1) notifying the static wear leveling unit for leveling the physical block which is to be leveled by using at least one of the block reclamation unit of the flash translation layer and the native file system;
  - (E2) identifying if the field value corresponding to the physical block in the block leveling table reaches a maximum value by examining if the field value in the physical block of the block leveling table appears 0, wherein if the maximum value is not reached, proceeding to step (E3), and if the maximum value is reached, proceeding to step (E4);
  - (E3) adding 1 into the field of the block leveling table whose value appears 0 for performing the maintaining operation, and proceeding to step (E4); and
  - (E4) finished with the maintaining operation, proceeding to step (F);
- (F) before the block reclamation unit starts to level the physical block of the flash memory, notifying the memory management unit to prohibit access to the flash memory, then proceeding to step (G);
- (G) moving a valid data stored in the physical block which is to be leveled, then proceeding to step (H);
- (H) the block reclamation unit starts to level the physical block whose valid data have been moved out, then proceeds to step (I);
- (I) notifying the memory management unit of a new physical address to which the valid data of the physical block is moved after leveling the physical block for updating a corresponding relationship between the new physical address of the physical block to which the valid data has been moved and a logical address of the valid data, then proceeding to step (J);
- (J) notifying the memory management unit that the physical block is leveled completely, then proceeding to step (K);
- (K) identifying if all values of the fields in the block leveling table appear 1, then proceeding to step (L); and
- (L) performing a recession operation in the block leveling table and then returning to step (B), wherein the recession operation further comprises the steps of:
  - (L1) identifying if all values of the fields in the block leveling table appear non-zero, wherein if all values of the fields appear non-zero, proceeding to step (L2), and otherwise, proceeding to step (L3);
  - (L2) subtracting the values of the fields of the block leveling table from the value of a minimum field of the block leveling table to achieve the value of the minimum field of the block leveling table appearing 0, and proceeding to step (L3); and (L3) finished with the recession operation; and (M) finished with the method for performing a static wear leveling.

2. The method of claim 1, wherein the block leveling table is a multi-bit value in step (B).

3. The method of claim 1, wherein the block leveling table is a single-bit value in step (B).

* * * * *